July 8, 1941.  E. W. GREINER  2,248,864
SAFETY GOGGLES
Filed April 4, 1940  2 Sheets-Sheet 1
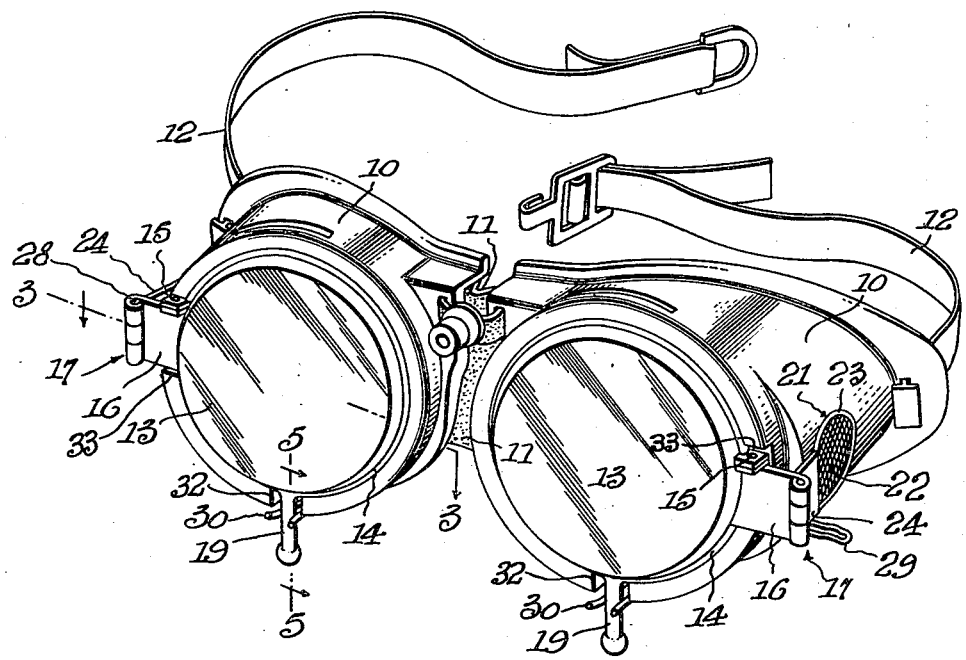
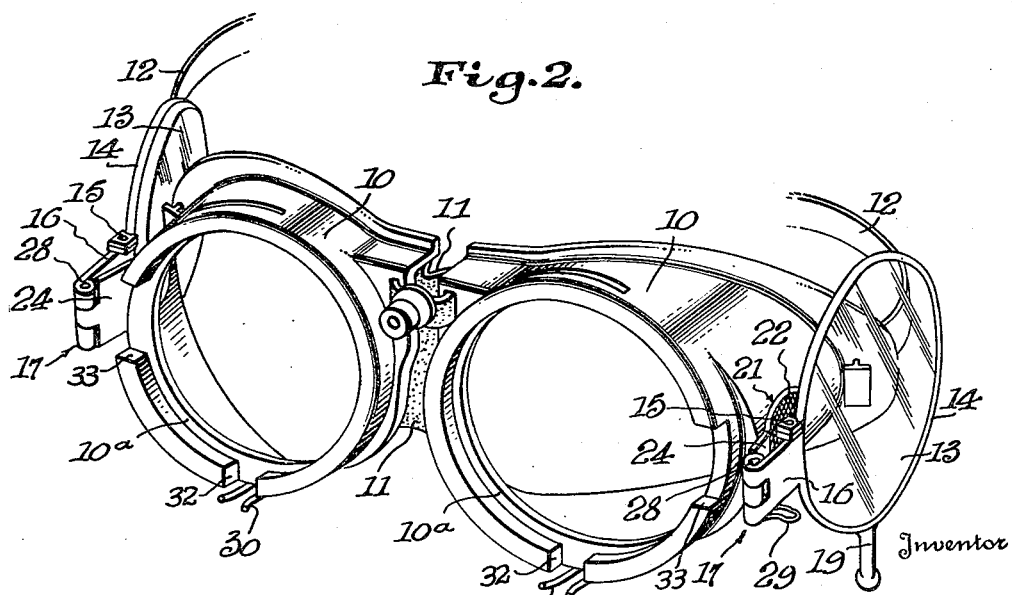
Inventor
Ernst W. Greiner July 8, 1941.  E. W. GREINER  2,248,864
SAFETY GOGGLES
Filed April 4, 1940  2 Sheets-Sheet 2
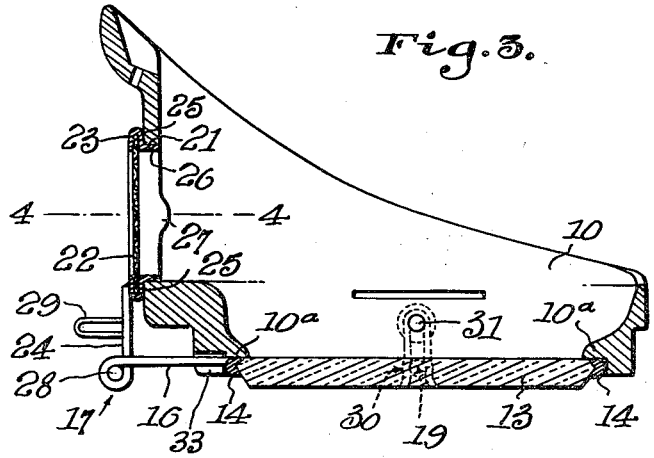
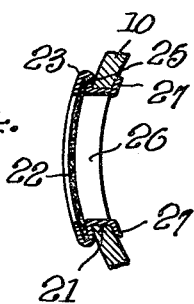
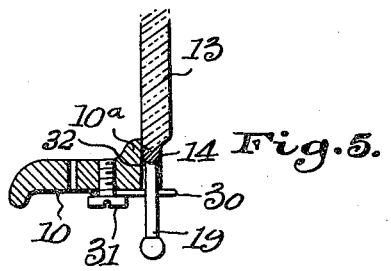
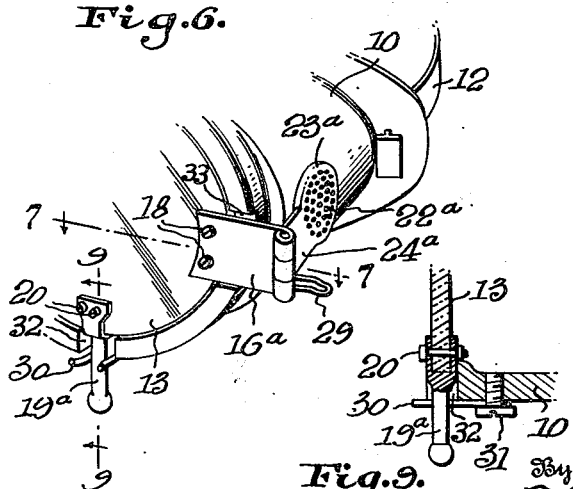
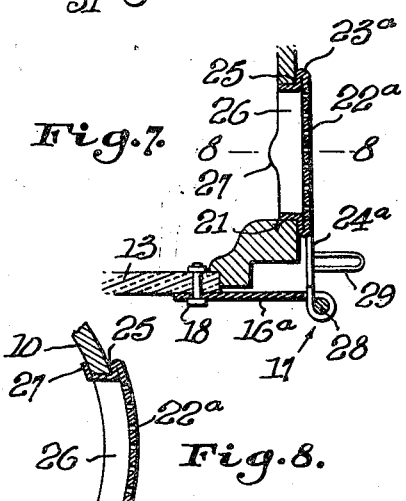
Inventor
Ernst W. Greiner Patented July 8, 1941

2,248,864

UNITED STATES PATENT OFFICE 2,248,864

SAFETY GOGGLES

Ernst W. Greiner, New Castle, Pa.

Application April 4, 1940, Serial No. 327,892

7 Claims. (Cl. 2—14)

The invention relates to improvements in goggles used for protection against dust and the like, and against glare, and it aims primarily to provide a novel construction in which the lenses may be swung to open positions to facilitate cleaning of their inner sides without the necessity of removing the head gear from the head.

Another object is to provide novel means for holding the lenses in normal closed position until forced from said position.

Yet another object is to provide novel means whereby the lenses may be held in vertical rearwardly swung position until forced therefrom, if their use be temporarily unnecessary.

Yet another object is to provide a novel construction for hingedly mounting the lenses upon the customary eye-encircling walls of the goggles.

A still further aim is to provide the lenses with downwardly projecting finger-pieces by means of which they may be readily opened or closed, and to provide U-shaped spring clips which cooperate with said finger-pieces to hold the lenses in closed position.

Yet another aim is the provision of novel spring fingers on certain leaves of the lens hinges and cooperable with the other leaves of said hinges to yieldably hold the lenses in open position.

With the foregoing and minor objects in view, the invention resides in the novel subject matter hereinafter described and claimed, description being accomplished by reference to the accompanying drawings.

Figure 1 is a perspective view showing one form of construction, the lenses being in closed position.

Figure 2 is a view similar to Fig. 1 but showing the lenses in open position.

Figure 3 is a horizontal sectional view through substantially one-half of the goggles as indicated by line 3—3 of Fig. 1.

Figure 4 is a detail vertical sectional view on line 4—4 of Fig. 3.

Figure 5 is a detail vertical sectional view on line 5—5 of Fig. 1.

Figure 6 is a fragmentary perspective view showing a somewhat different form of construction.

Figure 7 is a detail horizontal sectional view on line 7—7 of Fig. 6.

Figure 8 is a detail vertical section on line 8—8 of Fig. 7.

Figure 9 is a detail vertical section on line 9—9 of Fig. 6.

In the drawings above briefly described, 10 denotes two more or less conventional eye-encircling walls formed from plastic or any other desired material and connected by a nose bridge 11 forming no part of the present invention. Straps 12 are shown connected with the rear ends of the walls 10 to hold them in proper position against the face but the present invention is not concerned with how the goggles are mounted upon the head, nor with how the eye-encircling walls are connected with each other. The features of novelty are associated with the lenses 13 which are normally disposed at the front ends of the walls 10, the latter being preferably provided with internal forwardly facing shoulders 10ª which are engaged by said lenses when the latter occupy their normal closed positions.

In the form of construction shown in Figs. 1 to 5, each lens 13 is provided with a surrounding band 14 contractible by a screw or the like 15, to which band one leaf 16 of a hinge 17 is soldered or otherwise secured, there being, of course, one hinge for each lens. In Figs. 6 to 9, however, the lens 13 is rimless and a hinge leaf 16ª corresponding to the leaf 16 is secured to said lens by suitable fasteners 18. Also, in Figs. 1 to 5, each lens 13 is provided with a downwardly projecting finger-piece 19 which is soldered or otherwise secured to the band or rim 14, whereas in Figs. 6 to 9, the corresponding finger-piece 19ª is fastened to the lens by suitable fasteners 20.

In both forms of construction, the outer side portion of each eye-encircling wall 10 is formed with a lateral ventilating opening 21. In Figs. 1 to 5, a woven screen 22 covers each opening 21 and is provided with a marginal frame 23 to which the other leaf 24 of the hinge 17 is soldered or otherwise secured. In Figs. 6 to 9, however, a perforated sheet metal screen 22ª extends over each opening 21 and is provided with an integral marginal frame 23ª, which frame is integral with the hinge leaf 24ª corresponding to the leaf 24. The construction of each marginal frame 23, 23ª, is preferably such that it is provided with one flange 25 lying against the exterior of the wall 10, with another flange 26 fitting into the opening 21, and with a plurality of lugs 27 carried by the flange 26 and clinched against the inner side of the wall 10. It will thus be seen that each marginal frame is securely fastened to the wall 10 and that said frame not only secures a screen such as 22 or 22ª in place, but serves also to secure a hinge leaf 24 or 24ª to the wall 10.

It will be observed that the hinge leaf 16 or 16ᵃ projects laterally from the lens 13 and that the leaf 24 or 24ᵃ is disposed longitudinally at the outer side of the eye-encircling wall 10, the pintle or axis 26 of the hinge being disposed vertically. One edge, preferably the lower edge, of each leaf 24 or 24ᵃ is provided with an outwardly projecting spring finger 29 to yieldably engage the corresponding edge of the hinge leaf 16 or 16ᵃ when the lens 13 is swung outwardly and rearwardly by means of the finger-piece 19 or 19ᵃ, the lens being thus held in this position until forced therefrom.

The lower side of each eye-encircling wall 10 is provided with a U-shaped spring clip 30 to yieldably embrace the finger-piece 19 or 19ᵃ and thus hold the lens 13 in closed position until forced from this position, the clip 30 being secured to the wall 10 by a suitable fastener 31. The lower front portion of each wall 10 is, of course, provided with a suitable notch 32 to receive the finger-piece 19 or 19ᵃ when the lens is closed, and the outer front portion of each wall is notched at 33 to accommodate the hinge leaf 16 and the lens rim connection 15, or the hinge leaf 16ᵃ.

From the foregoing, taken in connection with the accompanying drawings, it will be seen that novel and advantageous provision has been made for carrying out the objects of the invention. By means of the finger-pieces, the lenses may be easily opened or closed without disturbing the positions of the eye-encircling walls 10 or any other portions of the goggles. With the lenses closed, their outer sides may be readily cleaned, and when said lenses are swung to open position, their inner sides are exposed for cleaning. The lenses will be yieldably held in either open or closed position until pushed therefrom; said lenses may be closed and used whenever desired; and when their use is unnecessary, they may be moved to open position, leaving the head gear on the head, however, so that the lenses may be repositioned for use whenever required.

As excellent results are attainable from the details disclosed, such details are preferably followed. However, within the scope of the invention as claimed, variations may be made.

I claim:

1. In a pair of goggles, an eye-encircling wall, a lens normally occupying a closed position at the front end of said wall, a vertical-axis hinge connecting said lens with said wall and permitting outward and rearward swinging of said lens to an open position in which it extends longitudinally at the outer side of said wall, a finger-piece projecting downwardly from said lens for swinging it to and from open and closed positions, a spring detent for holding said lens in closed position until forced therefrom, and an additional spring detent for holding said lens in open position until forced from this position.

2. In a pair of goggles, an eye-encircling wall, a lens at the front end of said wall, a hinge having two leaves at substantially right angles to each other, one of said leaves being secured to the outer side of said wall, the other of said leaves being secured to said lens, a spring finger projecting outwardly from one edge of said one of said leaves to yieldably engage the corresponding edge of said other of said leaves when said lens is swung to an open position at the outer side of said wall, and releasable means for normally holding said lens in closed position.

3. In a pair of goggles, an eye-encircling wall having a lateral ventilating opening, a lens at the front end of said wall, a screen having a rigid marginal frame secured to said wall around said opening, a hinge having one leaf rigidly secured to said marginal frame and a second leaf rigidly secured to said lens, whereby said marginal frame serves to attach both said screen and said hinge to said wall, and releasable means for normally holding said lens in closed position.

4. A structure as specified in claim 3, said one leaf and said marginal frame being integrally joined to each other.

5. In a pair of goggles, an eye-encircling wall having a lateral ventilating opening, a lens at the front end of said wall, a hinge having one leaf secured to said wall and formed with an integral perforated screen portion extending over said opening, said hinge also having a second leaf secured to said lens, and means for normally holding said lens in closed position.

6. In a pair of goggles, an eye-encircling wall having a lateral ventilating opening, a lens at the front end of said wall, a hinge carrying said lens, a frame carrying said hinge and extending around the edge of said opening, said frame having one flange portion lying against the outer side of said wall, a second flange portion fitting within said opening, and lugs on said second flange portion clinched against the inner side of said wall, and releasable means for normally holding said lens in closed position.

7. In a pair of goggles, an eye-encircling wall, a lens at the front end of said wall, means hingedly mounting said lens on said wall for outward and rearward swinging, a finger-piece secured to the lower portion of said lens and disposed substantially midway between the inner and outer ends of said lens, said finger-piece projecting downwardly beyond said wall for accessibility even with a gloved hand, and a forwardly opened spring clip secured to the lower front portion of said wall and normally embracing said finger-piece yieldably to hold said lens in closed position.

ERNST W. GREINER.